United States Patent

Mullen et al.

[15] 3,637,400

[45] Jan. 25, 1972

[54] HIGH-PRESSURE PROCESS FOR MAKING PUFFED FOOD PRODUCT AND PRODUCT

[72] Inventors: Joseph D. Mullen, Golden Valley; Alide Ogrins, St. Paul; Ali R. Touba, Crystal, all of Minn.

[73] Assignee: General Mills, Inc.

[22] Filed: Mar. 26, 1969

[21] Appl. No.: 810,776

[52] U.S. Cl. ............................................99/83, 99/82, 99/98
[51] Int. Cl. ............................................A23l 1/18, A23l 1/20
[58] Field of Search ................99/82, 83, 90 HP, DIG. 4, 80, 99/98

[56] References Cited

UNITED STATES PATENTS 2,478,438  8/1949  Thompson et al. ..........................99/82
2,824,806  2/1958  Matz..........................................99/83

*Primary Examiner*—Raymond N. Jones
*Assistant Examiner*—William Andrew Simons
*Attorney*—Anthony A. Juettner, William C. Babcock and Harold D. Jastram

[57] ABSTRACT

The process for producing a puffed food product having a high-protein level from a combination of legumes and cereal grains by subjecting the raw food product to high pressures and temperatures to produce a sheet of product having relatively high-protein-content and crunchy texture.

5 Claims, No Drawings

HIGH-PRESSURE PROCESS FOR MAKING PUFFED FOOD PRODUCT AND PRODUCT

The invention relates to a product and process for production of a high-protein food product incorporating the best characteristics of cereal grains and the best characteristics of legumes.

More specifically, the invention relates to combining cereal grains with legumes in order to produce a food product having the high-protein characteristic of legumes, such as soybean and the like, together with the many characteristics of cereal grains, including process of adaptability, appearance, desirable eating qualities, food consumption qualities and amino acid balance.

Cereal grains have long been a mainstay of the food industry for the production of high-quality food products of all types. These include finished products, such as ready-to-eat breakfast cereals, various types of pastries including bread, certain candy bars and the like. The food industry has utilized cereal grains for a number of reasons. First of all, cereal grains provide a number of the vitamin, mineral and other nutritive qualities necessary in food products. Further, cereal grains have been relatively easy to process and convert to attractive, easily chewable and readily consumable finished food product, which may be readily preserved while the product is transferred through the distribution channel of trade to the consumer.

While cereal grains are excellent raw food material, they do lack certain advantages of other raw food materials. For instance, cereal grains are not as high in protein as some other natural foods, such as meat. Accordingly, they do not provide the level of protein that many people desire or need in a food product. Furthermore, the cereal grains are not "complete" foods in that they are low in the amino acid lysine, which is essential for proper nutrition.

Legumes, such as soybeans, peas, and the like, are a food product that are known to be very high in protein. Soybeans, for example, have a processed protein level which might be equal to or higher than many meat products. Further, these legumes appear to have high-protein level necessary for good nutrition and are relatively high in the amino acid lysine. These legumes, on the other hand, do not possess all of the desirable characteristics necessary for good food-processing procedures. Legumes have low levels of the amino acid methionine which is necessary for a well-balanced diet. Also, it has been found that a legume is somewhat difficult to handle in order to produce a finished product which is tasty and easy to chew.

Accordingly, it has been found that it is possible to combine a cereal grain with a legume and thereby utilize the best characteristics of each of these raw food materials to produce a very palatable finished food product which is high in protein and which has excellent nutritive characteristics in addition to excellent taste, texture, palatability characteristics and good amino acid balance.

Typically food products, such as noted above, are processed by soaking, grinding, cooking, mixing and similar steps after which the products are cooked, toasted, puffed, sheeted or otherwise baked to develop flavor. These various steps are usually taken in order to arrive at one or more desired end products such as puffed breakfast cereals, cookies, biscuits and the like. For instance, in the cereal industry, frequently whole kernels of grain are individually puffed to permit them to be used as a ready-to-eat breakfast cereal. Typically before the individual grains can be puffed, they must be soaked and otherwise prepared for the puffing operation, after which they are toasted and flavored. Likewise, in the baking industry, these same cereal grains or legumes are first ground to a fine consistency. This grinding obviously is a step to improve the "chewability" of the product. After the grinding, the product is then frequently, mixed with one or more other ingredients or mixed with water in order to produce an end product by baking to develop flavor and texture. It can be seen that all of these methods involve a number of individual steps which must be carried out in a predetermined order thus requiring the expenditure of a great deal of time and effort to produce a chewable, consumable product. The present process may be utilized to produce a new product which eliminates many of the usual time consuming, expensive steps practiced in the food industry. The process involves placing granulations of legumes and cereals together to form a mixture having the desired nutritional characteristics. This combined mixture is then agglomerated to form particles combining the individual particles of the legume and cereal grain. Agglomeration is defined in this application to mean a production of a wet mass of particles stuck together in the form of granules with the aid of moisture with sufficient cohesion to permit the granules to be dried. There are a number of ways known in the art for accomplishing this. For example, one such method for doing this is subjection of the wetted ground particles to mechanical agitation. Another process involves fluid bed techniques. Any of these methods might be utilized to form the wet granules. After the granules are formed, they are dried to a suitable moisture level after which they are subjected to mechanical pressures and high temperatures. The pressure is suddenly release from the product which causes the finished product to expand or become "puffed" and thereby cause the individual particles to become cemented together to form a sheet or wafer of food product.

The product formed according to the above-noted process takes on the appearance of a mosaic sheet having a pattern which is predetermined by the granule and particle size and shape used in the process. The food product also takes on a textured appearance due to the differing puffing characteristics of the legume and cereal. The cereal tends to puff much more than the legume with the result that there are "high" and "low" surface areas. The cereal forms the "high" surface and the legume the "low" surface thus resulting in a product having a very pleasing appearance and texture.

The natural ingredients of the raw material provides the cementing ingredient for producing a wafer or sheet of puffed food product which is high in protein and which takes on a toasted flavor as a result of the application of high temperatures during the puffing and cementing operations. The protein and carbohydrate fractions produced by the heat and pressure are believed to be the bonding agents. The finished product also is crunchy, almost crumbless, and may be flavored by the use of oils, such as vegetable oil.

Accordingly, it is noted that the product produced by this invention eliminates many of the processing steps heretofore practiced in the food industry for producing a finished puffed food product and additionally the invention provides a new high-protein food product in palatable form combining the best attributes of a variety of food products.

In accordance with the present invention, a legume, such as peas, lentils, soybeans, chickpeas and the like, may be cooked and ground to provide a flour. The particle size of the flour may vary; however, a preferred particle size is about 0.05 inches. Next, a cereal grain, such as wheat, rice, barley, oats, corn, popcorn, millet, sorghum or similar grains, is selected. For the purpose of describing the invention, rice will be utilized as the cereal grain. The rice product is ground to form a flour which has a particle size of about 0.009 inches to about 0.066 inches. The legume flour and the cereal flour are then combined to form a flour mixture wherein at least 30 percent of the mixture by weight is the legume product. It might be pointed out here that greater concentrations of legume may be used in order to increase the protein level of the finished product.

This flour mixture is then agglomerated. As previously noted, there are a number of ways illustrated in the prior art and practiced generally in the food industry for producing these agglomerates of the flour. In general, sufficient water is added to the mixture in order to form granules of the mixed legume and cereal grain which are strong enough to withstand further handling and heating for drying purposes. These granules normally form in random sizes which is satisfactory for producing an attractive finished product. After the granules have been formed, they are dried to reduce the overall moisture level. The granules are dried to reduce the moisture content by weight to about 8 to 16 percent. It has been found that a granule having 16 percent by weight of moisture, for example, will produce a puffed product having a very low density whereas a product having a moisture level of 8 percent by weight will not puff nearly so much and will be rather dense. Accordingly, it has been found that a very satisfactory product combining most optimum characteristics is prepared from granules which have been dried in the range of 11 to about 13 percent by weight. The drying can take place in a forced draft oven and temperatures in the range of 85° C. to 90° C. have been found sufficient to provide a satisfactorily dried product.

The dried granular material is then placed between the plates of a mechanically operated press which squeezes the product between plates to a pressure of not less than 100 pounds per square inch. Application of pressures up to 1,000 pounds per square inch have been found to provide a very satisfactory product. The choice of pressure to be applied to a particular product will depend to some extent upon the desired characteristics of the end product. For instance, it has been found that application of the higher pressures to the food product will result in less time required to heat the product and thereby achieve the desired flavor and physical characteristics for the finished product. It has been found that a very short cooking time is necessary to produce a finished product by the application of pressure in the range of 100 pounds per square inch to 1,000 pounds per square inch since the time required to puff and cook the product is about 1 second to about 30 seconds.

Heat is applied to the product while it is being subjected to the mechanical pressure. When temperature in the range of 300° F. to about 700° F. are combined with pressures in the range of 100 pounds per square inch to about 1,000 pounds per square inch, a puffed and cooked product having toasted flavor is achieved. The time necessary to achieve this result is very short, in the neighborhood of about 1 second to about 30 seconds. The puffing occurs as the mechanical pressure on the heated raw material is suddenly released and the elevated temperatures of the food product cause expansion of the moisture in the food product and thereby puffs the individual particles of raw material.

The release of the mechanical pressure on the raw material was discovered to achieve another desired result, namely, a cementing of the individual raw material particles and granules together. It was found that as the pressure was suddenly release from the raw material, the individual particles puffed and expanded to a considerable degree. The expanding particles and granules contacted each other and they became cemented together very firmly. No ingredient was added to the raw material to accomplish this cementing action but it was observed that a very strong bond was created. Presumably, the naturally occurring ingredients in the legumes and grains, when elevated to the above-noted temperature, act as to a cementing agent, and as the individual particles were expanding due to the release of temperature, these naturally occurring ingredients formed a bond to produce a puffed wafer or sheet having an attractive mosaic pattern. If was found that the use of a lower pressure produced a product with somewhat less cohesive characteristics after puffing. The products puffed to a satisfactory degree and formed a satisfactory wafer or sheet; however, it was found that as the product was broken, that the cemented bond seemed to have somewhat less strength than if the higher pressures were used to form the product. In some situations, it may be desirable to have a product with a weaker bond, thus permitting the product to more readily disintegrate in the mouth of the consumer as the product is eaten. On the other hand, if it is anticipated that the product will be subjected to severe handling conditions during marketing of the product, the higher pressures might be utilized in order to achieve a stronger bond and thereby prevent damage to the product in transit.

One of the outstanding characteristics of this product was discovered to be the relatively crumbless nature of the product as it is broken or eaten by the consumer. When a bite is taken from a wafer-size product, there is no tendency for the product to crumb in the sense that a cookie or similar food product will crumb. The cementing which occurs between the individual particles of the raw material is credited with providing this anticrumb characteristic.

After the product has been puffed and cemented, it is dipped in oil to flavor the product. The oil which may be used to flavor the product may be either animal or vegetable in origin; however, preferably a vegetable oil is used. Vegetable oils, such as coconut oil, corn oil, cottonseed oil, safflower oil and the like, have been found to be successfully used to achieve a very tasty product. An example of a method for coating the product with oil would be to dip the finished sheets into oil which is heated to 200° C. The oil-coated product is then flavored with salt, seasonings and the like if a variety of flavors might be desired.

A more complete understanding of the product and process may be achieved by reference to the following examples of specific products which were produced according to the invention.

EXAMPLE I

Raw whole chickpeas were cooked at 460° F. while being subjected to high pressures. The peas were cooked for about 1 to 2 seconds and were then ground to a particle size of about 0.050 inches. Rice was ground to a fineness whereby it would pass through a U.S. standard sieve No. 8. The ground chickpeas and rice were then mixed according to the following formula:

100 grams of chickpeas
50 grams of ground rice.

This mixture was then agglomerated by adding about 113 ml. of tap water during the agglomeration. This formed granules of wet mixture which was then dried in a forced draft oven at temperatures of 85° to about 90° C. until the moisture content of the individual granules was reduced to 11 percent by weight. The dried granules were then placed between the plates of a hydraulically operated press where they were subjected to a pressure of 1,000 pounds per square inch and heated to a temperature of 460° F. for about one second. The pressure was rapidly released so that the resulting product became puffed and the individual particles and granules became cemented together to form a sheet of food product having a mosaiclike appearance. The chickpeas provided a light brown coloration to the finished product and the rice particles provided a lighter color which was randomly distributed throughout the finished product. The puffed and finished product was then dipped in coconut oil, heated to 200° C. and lightly salted to provide a high protein, puffed, salted snack having a somewhat toasted flavor.

EXAMPLE II

Example II was prepared in exactly the same fashion as set forth in example I above except that the legume used was green peas.

Example III

Example III was prepared substantially the same as example I with certain variations. In this example, the legume used was soybean flour. Rice was used having a granular size which passed through a U.S. standard sieve No. 12. The soybean and rice flour was mixed in equal portions and was then agglomerated by using 250 ml. of water for a total of 400 grams of the combined soy and rice flours. The water used for agglomeration contained the following ingredients.

0.3 grams monosodium glutamate
12.0 grams salt
4.0 grams nonfat milk solids 4.0 grams corn sugar
4.0 grams melted coconut oil A pastelike product was produced which was then passed through a U.S. standard sieve No.6 in order to provide granules of material. These granules were then dried in a forced draft oven at a temperature of about 77° C. to about 85° C. to lower the moisture content of the particles to about 14 percent by weight. The dried mixture was the screened through a U.S. standard sieve No. 16 to remove the fines. The coarse portion was puffed in the same fashion as described in example I except that 800 pounds per square inch of force was applied to the product for less than a second as the product was heated to temperatures of 460° F. The resulting product resembled in apppearance and texture the product of example I. The product as in example I was then coated with coconut oil, heated to a temperature of 200° C. and was then salted for flavor.

EXAMPLE IV

Example IV is exactly the same as example III except that soy grits were substituted for soy flour.

The protein level of the products prepared according to the above examples was calculated according to the data from USDA Agricultural Handbook No. VIII and the following protein levels were found in the various examples:

Approximate Percentage Protein

| Example | After puffing | dipping in oil |
|---------|---------------|----------------|
| I | 17 | 12 |
| II | 17 | 12 |
| III | 27 | 18 |
| IV | 27 | 18 |

It will be observed from these protein levels that the finished product is relatively high in protein. In addition, it is noted that the amino acid balance provided by both legumes and cereal products is excellent since adequate levels of lysine and methionine are present in the finished product.

It is to be noted that there are a number of variations which may be made to the above-described invention without departing from the spirit and the scope thereof. For example, various ratios of legume to cereal might be used. A very satisfactory ratio of chickpeas to rice was found to be a mixture of 2 to 1, and an equally satisfactory ratio of soy flour to rice mixture was found to be a 1 to 1 mixture. The optimum moisture level for the agglomerated produce appeared to be in the 11 percent to 13 percent range; however, moisture levels in the 8 percent to 16 percent range, measured by weight, were also found to be very satisfactory and produced excellent quality products.

We claim:

1. A process for forming a wafer of high-protein puffed food product which comprises the steps of intermixing ground cereal grain with roasted and ground legume to form a mixture composed of at least 30 percent legume by weight, agglomerating the mixture with sufficient water to produce individual sticky granules containing the ground cereal grains and ground legume, drying the granules to a moisture level of 8 to 16 percent by weight, squeezing the granules between opposing mechanical surfaces to subject the granules to a pressure of not less than 100 p.s.i., heating the granules to a temperature of from 300° F. to about 700° F. for about 1 to about 30 seconds while the granules are being squeezed, rapidly releasing the pressure on the granules to cause the particles to expand and become cemented together to form a wafer of high protein puffed food product and then coating the wafer with oil to flavor the wafer.

2. A process in accordance with claim 1 in which the aggolmerated granules are dried to a moisture level of from 11 to about 13 percent by weight, in which the granules are squeezed at pressures of 100 p.s.i. to about 1,000 p.s.i. and in which the oil is a vegetable oil.

3. A process in accordance with claim 1 in which the ground cereal grain has a particle size of 0.009 inches to about 0.066 inches and the ground legume has a particle size of about 0.05 inches.

4. A process in accordance with claim 1 in which the legume is soy flour and in which the cereal grain is rice.

5. A product produced by the process of claim 1.

* * * * *